Aug. 8, 1933.     D. W. SMITH     1,921,267
PIE PLATE WASHING
Filed Nov. 17, 1930
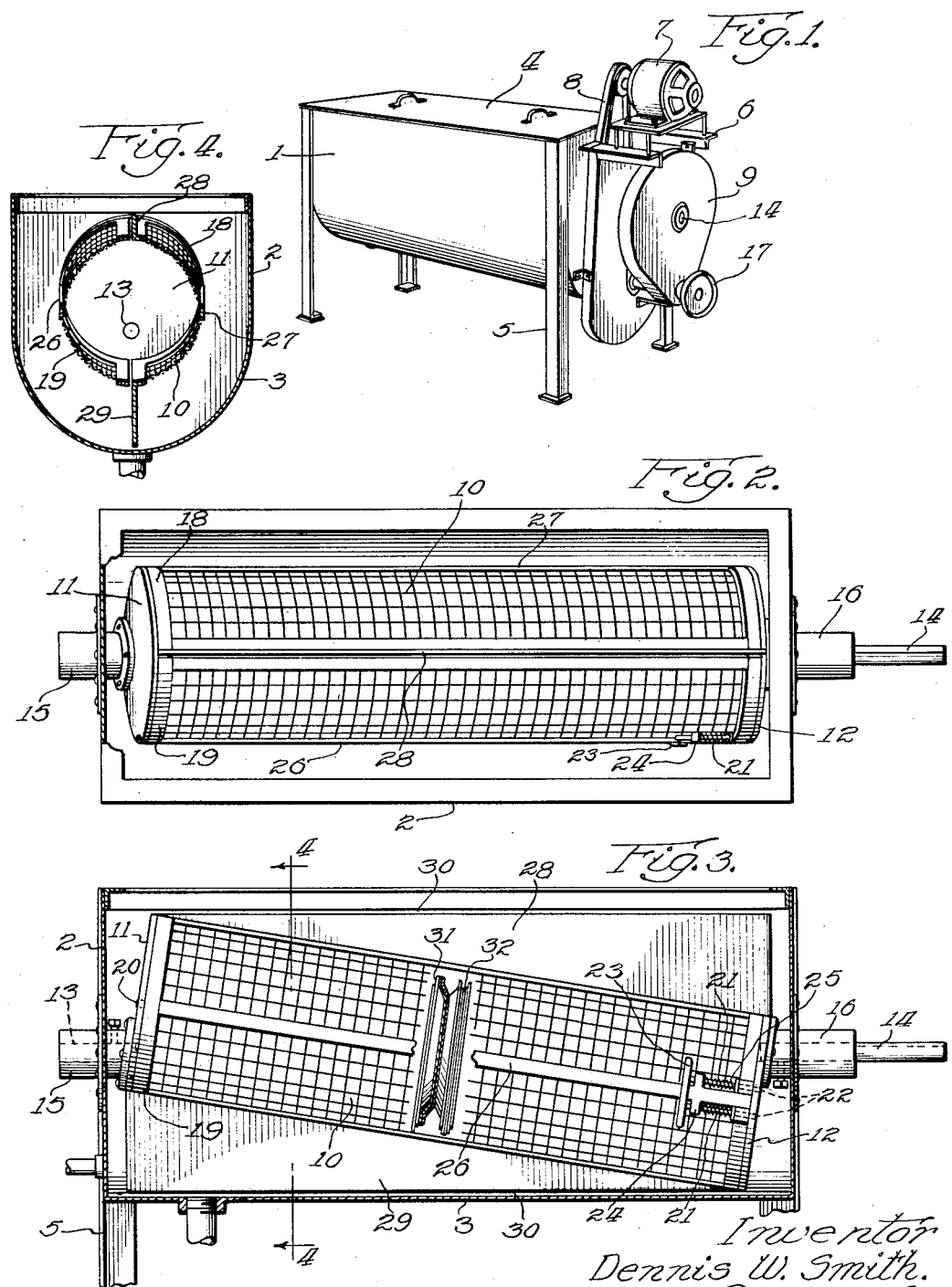
Witness
Arthur M. Franke.
Inventor
Dennis W. Smith.
Rummler, Rummler
& Woodworth   Attys.

Patented Aug. 8, 1933

1,921,267

UNITED STATES PATENT OFFICE 1,921,267

PIE PLATE WASHING

Dennis W. Smith, Wilmette, Ill., assignor to Colborne Manufacturing Company, Chicago, Ill., a Corporation of Illinois Application November 17, 1930
Serial No. 496,202

2 Claims. (Cl. 141—9)

This invention relates to method of washing sheet metal articles, such as pie plates, cake pans, etc., which are generally of disk form and will interfit or nest with one another in a washing machine. The purpose of the invention is to provide a method for effecting rapid and thorough cleansing of such articles by imparting a rubbing or scrubbing action therebetween during the washing operation.

In the drawing which illustrates a convenient means for practicing the invention:

Figure 1 is a perspective view of an entire washing machine.

Fig. 2 is a detail in plan of a tank and plate-holding cage rotatably mounted therein.

Fig. 3 is a side view of the cage partially broken away and shows the tank in section.

Fig. 4 is a transverse sectional view taken on the line 4—4 of Fig. 3.

The main features of the construction illustrated include a tank within which is rotatably mounted a wire or reticulated metal cage. The cage at its ends is provided with trunnions fitting bearings in the ends of the tank and one of which trunnions extends through a bearing for receiving a gear meshing with reduction gearing connecting to a motor mounted on the outside of the tank. The trunnions of the cage are not in line with the axis of the cage but are offset therefrom to provide an axis of rotation which is diagonal to the true axis of the cage.

With this arrangement, for example, pie plates which are stacked on edge in the cage and are of lesser diameter than the cage, will, upon rotation of the cage at the normal speed thereof, roll around different paths and thus rub against each other. This action, together with the action of the cleansing fluid in the tank, insures a rapid cleaning of pie plates, removing all particles which may be burned thereon and the plates are found to be in a bright, sanitary condition when removed from the water after a rinsing operation therein.

As shown in the drawing, the tank 1 has vertical side walls 2, a semi-cylindrical bottom 3 and a removable lid 4 at the top. The tank is secured to supporting legs 5 and at one end is provided with brackets 6 for supporting a motor 7 which, through a belt drive 8 and gearing within the casing 9, serves to drive the rotating plate-holding cage 10. The cage is an open symmetrical structure but has an axis of rotation which is diagonal to its geometrical axis. The ends of the cage or cylinder 10 are closed by disks 11 and 12 to which are secured trunnions 13 and 14 extending through bearings 15 and 16 secured to the ends of tank 1.

The trunnion 14 extends beyond the bearing 16 far enough to receive a driving gear, and a hand wheel 17 is included in the driving means and is convenient for rotating the cage independently of the motor for bringing a cover section thereof upward when filling and emptying the cage.

The cage is made in sections 18 and 19. The former is rigid with the end disks 11 and 12 of the cage and the latter is removably secured to the end disks through a pin 20 fitting an aperture in disk 11 and pins 21 which may be slid into and out of engagement with apertures 22 in the end disk 12. For this purpose the pins 22 are carried by a handle 23 and slide within bearings 24 against the action of springs 25. The bearings 24 are formed in a reinforcing bar 26 on the removable lid section 19 of the cage.

The portion 18 of the cage which is secured to the end disks is likewise reinforced by a bar 27. Section 18 has extending along its edges projecting fins 28 and 29 of triangular form as best shown in Fig. ?.

These vanes are wider at one end than at the other, so that their straight outer edges 30 will follow the inner surface of the semi-cylindrical bottom portion of the tank and lift considerable of the cleansing fluid, as the cage rotates. As, during operation, the tank is about half filled with the cleaning fluid, the vanes serve to lift the fluid above its normal level and drip it through the plates within the cage.

In carrying out the improved method use may be made of the machine by stacking plates edgewise therein, preferably in two oppositely disposed sets, as partially indicated by the sets of plates 31 and 32 in Fig. 3. The tank is about half filled with hot water to which is added the required amount of soap or other cleanser. Then the lid 4 is replaced on the tank and the motor operated. The cage is then rotated in its offset bearings carrying each plate through a different circular path and as the plates are of less diameter than the cage and are loosely packed therein, they rub against each other as they roll and fall in independent circuits. This action serves to rapidly and thoroughly cleanse and brighten the plates. After the required period of operation, the tank is drained and refilled with rinsing water while the cage still rotates.

I claim:

1. The method of washing pie plates which consists in assembling the plates in interfitting relation in a washing fluid and causing the plates to roll edgewise, and rocking the plates back and forth around their supporting edges transversely to their direction of rotation.

2. The method of washing pie plates which consists in assembling the plates in interfitting relation to stand edgewise in a washing fluid and then causing each plate to simultaneously rock on its supporting edge transversely to the plane in which the plate lies and to roll in a circular path which is eccentric to the paths of movement of the other plates.

DENNIS W. SMITH.